Nov. 21, 1967  F. J. LUKETA  3,353,293
TRY NET TRAWL DOORS
Original Filed Aug. 31, 1964  7 Sheets-Sheet 4

Fig. 5.

INVENTOR.
FRANK J. LUKETA
BY
ATTORNEYS

Nov. 21, 1967  F. J. LUKETA  3,353,293
TRY NET TRAWL DOORS

Original Filed Aug. 31, 1964  7 Sheets-Sheet 5

Fig. 6.

INVENTOR.
FRANK J. LUKETA
BY Mattis & Graybeal
ATTORNEYS

INVENTOR.
FRANK J. LUKETA
BY
ATTORNEYS

0
United States Patent Office 3,353,293
Patented Nov. 21, 1967

3,353,293
TRY NET TRAWL DOORS
Frank J. Luketa, 5567 Greenwood Ave. N.,
Seattle, Wash. 98103
Continuation of application Ser. No. 516,829, Nov. 26, 1965, which is a continuation of application Ser. No. 393,137, Aug. 31, 1964. This application Dec. 19, 1966, Ser. No. 628,177
12 Claims. (Cl. 43—9)

ABSTRACT OF THE DISCLOSURE

A generally circular trawl door having an offset peripheral edge portion, interchangeable ballast and buoyancy means, a roll bar and a towing bridle removably secured to the panel of the door, the door having a resiliently compressible edging removably secured to the offset peripheral edge portion of the door panel, the edging being formed from interchangeable sections.

---

This application is a continuation of my now abandoned copending application Ser. No. 516,829, entitled Trawl Doors for Try Nets, and filed Nov. 26, 1965, as a continuation of my now abandoned application Ser. No. 393,137, entitled Try Net Trawl Doors and filed Aug. 31, 1964, as a continuation-in-part of my now abandoned prior application Ser. No. 219,276, filed Aug. 4, 1962, and entitled Trawl Doors, which application is in turn a continuation-in-part of my now abandoned application Ser. No. 827,025, filed Aug. 31, 1959, and entitled Trawl Door.

The present invention relates to trawl doors, and more particularly to relatively small trawl doors, especially adapted for use with try nets and characterized generally by a circular shape, an all-around marginal edging of a wear resistant material, set flush with the face of the water reaction panel on the anterior side of the door, and a one-piece, streamlined towing warp bridle, such features combining to give such doors relatively low total "drag" characteristics.

Trawl doors are employed in pairs, one on each side of the trawl net, and they function to spread apart the net side elements that precede and lead fish into the funnel of the net. Each trawl door is towed in the water in a generally upright position, with its leading or anterior face at an angle to the direction of tow. The water contacting the leading faces of the doors is deflected thereby and accelerated into a new direction, creating reaction forces having laterally outwardly directed components which tend to move the doors apart and keep the mouth of the net open.

The water reaction forces so produced also have rearwardly directed components, which are termed "drag forces," or more simply "drag." These forces, of course, act oppositely to the direction of travel, and power must be expended aboard the trawler to overcome them. The drag produced by the pressure differential between the two sides of the door is termed "pressure drag." The magnitude of the pressure drag depends upon several things, including the shape of the door. A "wake" or low pressure area is formed behind each door as it is towed in the water at a given angle of attack. In general, the pressure drag is dependent upon the size of the wake; if the wake is large, the drag is large, and when the wake is reduced, the drag is also reduced. The shape of the door has a great influence or determining effect on the size of the wake.

There are other factors which contribute to the total drag or resistance of each trawl door, including the drag of the various accessories or components of the door which are attached to the water reaction panel, and the "frictional drag" or tangential shear stresses which exist when fluids flow over solid boundaries, the magnitude of which depends largely on the geometrical complexities of the surface. A relatively smooth, flat surface, offers a minimum of disturbance to the flow and produces a relatively small amount of frictional drag. In the case of bottom trawl doors, which are actually dragged along the bottom of the ocean, sliding frictional forces are produced, which contribute to the total resistance of the trawl doors. The value or magnitude of these forces is primarily dependent upon the total weight of the door in the water, the character of the ocean bottom, and the area of contact of the lower edge of the door with the ocean bottom.

It is a primary object of the present invention to provide a new and improved trawl door which combines the ability to produce sufficiently large transverse or lateral forces with (a) a relatively low weight, (b) a relatively low resistance in the towing direction attributed to pressure and frictional drag and sliding frictional forces, and (c) a relatively simple, yet strong, durable and inexpensive construction.

Trawl doors according to the present invention are preferably circular in shape. This shape permits the free flow of water past the door in what would be the four corner areas of a door having rectangular proportions. Some of the water flowing in these areas finds its way into the region behind the door and somewhat lessens the size of the wake created there during trawling, and in that manner lowers the pressure differential that would otherwise exist across the two sides of the door, and this in turn lessens the pressure drag produced by the door. As a further result of the circular shape, the portions of the lower edge of the door that makes frictional contact with the bottom is relatively short in comparision with the lower edges of conventional bottom trawl doors having rectangular proportions.

Trawl doors according to the present invention are each preferably provided with a towing warp bridle that is relatively small, streamlined, and arranged so that its major dimension extends in substantial parallelism with the path of travel of the trawler. This causes the water to flow around and past the bridle in relatively smooth, uninterrupted streams, which are substantially evenly divided between the two sides of the bridle. As a result, the bridle produces and contributes a minimum of frictional and pressure drag to the total drag of the door.

Trawl doors according to the present invention are also preferably provided with wear-resistant marginal edging which is set flush with the surface of the water reaction panel on the anterior side of the door. This produces a generally uninterrupted surface at the anterior side of the door and lessens the tangential shearing forces or frictional drag on the anterior side of the door.

In trawling for shrimp it is customary to drag a try net of small size preliminary to setting out the main net, in order to determine if shrimp are present and in numbers such as will pay to use the larger main net, and to determine the species. The try net is also used intermittently as a bottom sampler while towing the main net to assist in keeping the main net on more dense concentrations of shrimp. The try net is much more quickly and easily handled than the very much larger main net, and it requires smaller and lighter doors. In addition to being smaller and lighter, it is necessary that the try net trawl doors be capable of sinking rapidly and that they offer relatively little difference in the direction of pull so that they, along with the try net, can be swiftly removed from the water. Trawl doors according to the present invention meet this criteria and consequently are well suited for use with try nets. However, it should be understood that several of the features of the present invention represent improvements in trawl doors in general, and their application are not limited to any particular type, size of shape of trawl door, except as is specified in the accompanying claims.

Another object of the present invention is to provide a simple yet strong and effective connector for securing trawl door accessories, such as the towing warp bridle, for example, onto the water reaction panel, comprising a tapered socket opening formed in a reinforced portion of, or boss formed on, the water reaction panel, for example, and shaped to receive and snugly accommodate a similarly shaped mounting portion of the accessory. A fastening means, such as a stud or bolt, engaging a relatively large diameter washer, is inserted, from the side of the door panel opposite from the accessory, and screwed into an internally threaded, blind opening formed in the end of said mounting portion. When tightened this stud serves to detachably secure the mounting portion in the socket opening and hence the accessory onto the water reaction panel.

A still further object of the present invention is to provide marginal edging for the water reaction panel that is sectional and comprises identical and interchangeable front and rear edge sections, and identical and interchangeable top and bottom edge sections, all of which are preferably molded from rubber or a similar resilient, wear-resistant material. Since the front and rear sections are identical, and the top and bottom sections are likewise identical, only two different types of molds are necessary, resulting in slower manufacturing costs. Preferably the top and bottom sections of edging are each formed to include a runner portion which progressively widens from its two ends, whereat it is as wide as the front and rear sections are throughout their entire lengths, towards its middle, whereat such section of edging makes its main contact with the bottom, when it is employed at the bottom edge of the water reaction panel.

Preferably, the sections of edging according to the present invention are each formed to include two side portions, which in use extend contiguously outboardly of the two sides of the marginal portion of the water reaction panel, and a peripheral portion which extends around the edge of the door and interconnects the two side portions. A series of openings are formed in the marginal portion of the water reaction panel and a like number of anchor plugs project from the inboard suface of one of the side portions of edging, through said openings in the panel, and through somewhat larger openings formed in the other side portion. A suitable fastening means, preferably in the form of a flathead screw, the head of which is countersunk in a washer, of a diameter larger than the diameter of said openings in the second side portion, screws into the outboard end of each plug, and serves to detachably secure the edging onto the panel.

These and other objects, features, advantages and characteristics of trawl doors according to the present invention will be apparent from the following description of a typical and therefore non-limitive embodiment of such doors, taken in conjunction with the accompanying illustrations thereof, wherein like letters and numerals refer to like parts, and wherein:

Figure 1:
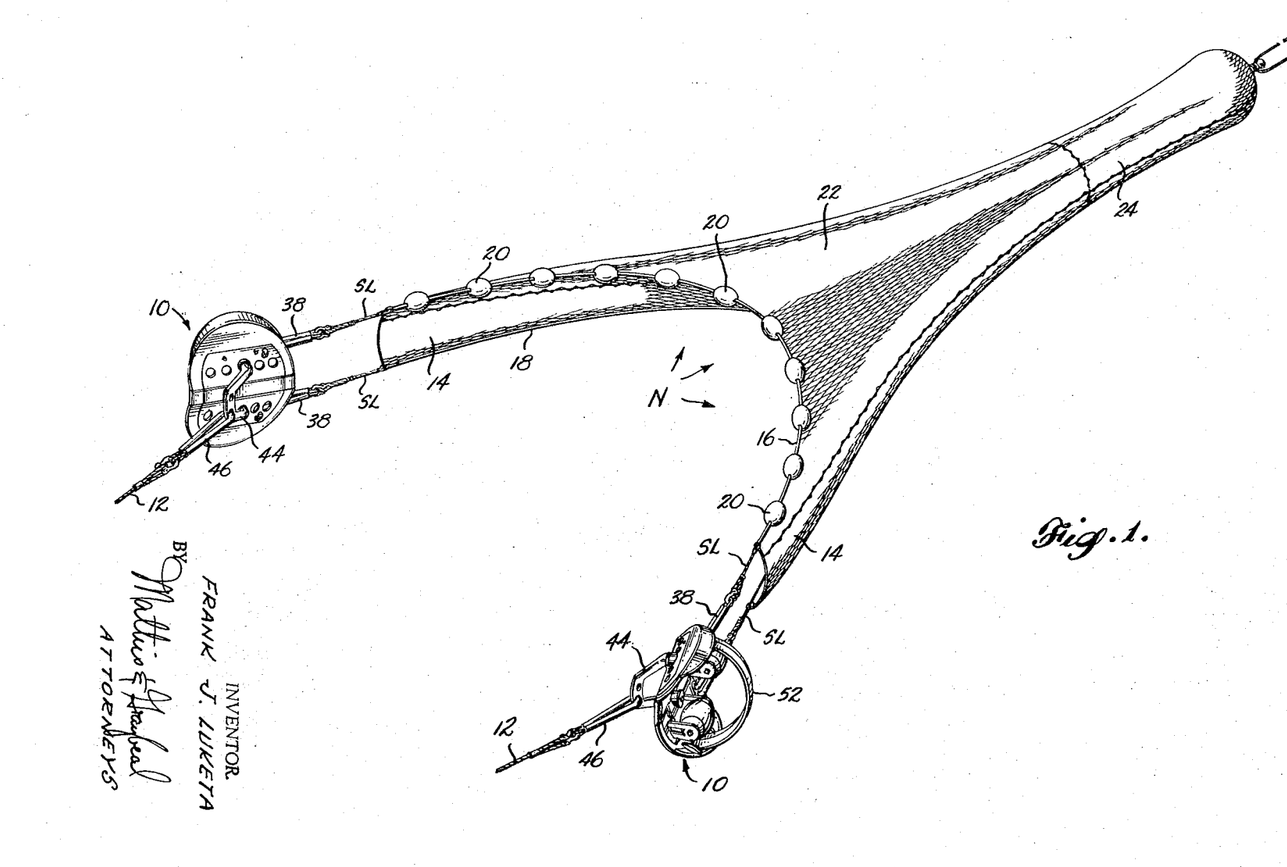
FIG. 1 is a perspective view of a try net assembly, showing a pair of doors constructed according to the invention spaced forwardly of, connected to, and used to spread apart the side elements of the net.

Referring more specifically to FIG. 1, the try net layout illustrated thereby includes a trawl door 10 at each side of a try net N, which doors are dragged forwardly in the water by towing warps 12 extending aft from a trawler (not shown). The doors 10 spread apart the net side elements 14 which are secured along their upper and lower edges to float line and ground line 16, 18, respectively. Floats 20, secured at intervals along the float line 16, serve to hold the mouth of the net open in the vertical direction. The after ends of the net side elements 14 merge into and are a part of the net funnel 22, which in turn merges into a cod end 24, the after end of which is closed during trawling. Relatively short sweep lines SL interconnect between the float line and the ground line 16, 18, respectively, and the two doors 10.

Referring now to FIGS. 2–19, the door embodiment illustrated comprises a circular, preferably cast aluminum, water reaction panel 26, which in lateral cross-section is of a trihedral configuration with symmetrical panel portions 28, 30 above and below a horizontal center line C/L which coincides with the longitudinal axis of a central panel portion 32 (see FIG. 5). The upper and lower panel portions 28, 30 are swept back substantially at the panels leading face, the said portions 28, 30 having an angle therebetween of about 140° on the trailing or posterior side of the panel 26.

As shown in FIGS. 11, 13, 14 and 16–19, in the greater portion of its extent the water reaction panel 26 is relatively thin, but reinforcing ribs 34 are formed on its posterior side, and the portions of such panel 26 to which the door accessories are attached are made thicker than the main body of the panel 26. For example, the area immediately surrounding and in between the openings 36 formed in the rearward portion of the door for receiving the leg portions of flexible shackles 38, serving to interconnect the door panel 26 and the sweep lines SL, are substantially thicker than those portions of the door extending between the reinforcing ribs 34. These thicker portions in the vicinity of the openings 36 are in reality bosses, and will hereinafter be referred to as such, and are designated 40.

Figure 5:
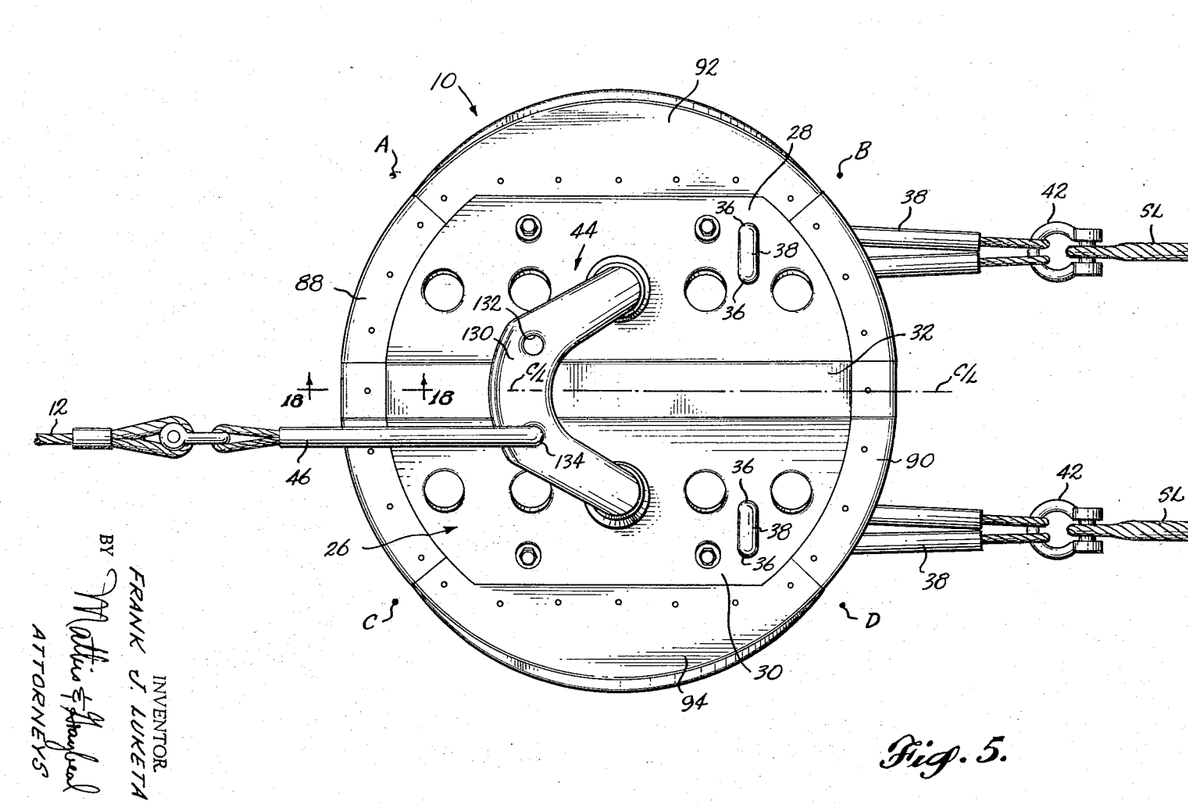
FIG. 5 is a side elevational view, on yet a larger scale, of the anterior side of the starboard door of FIGS. 1 and 2.
Figure 6:
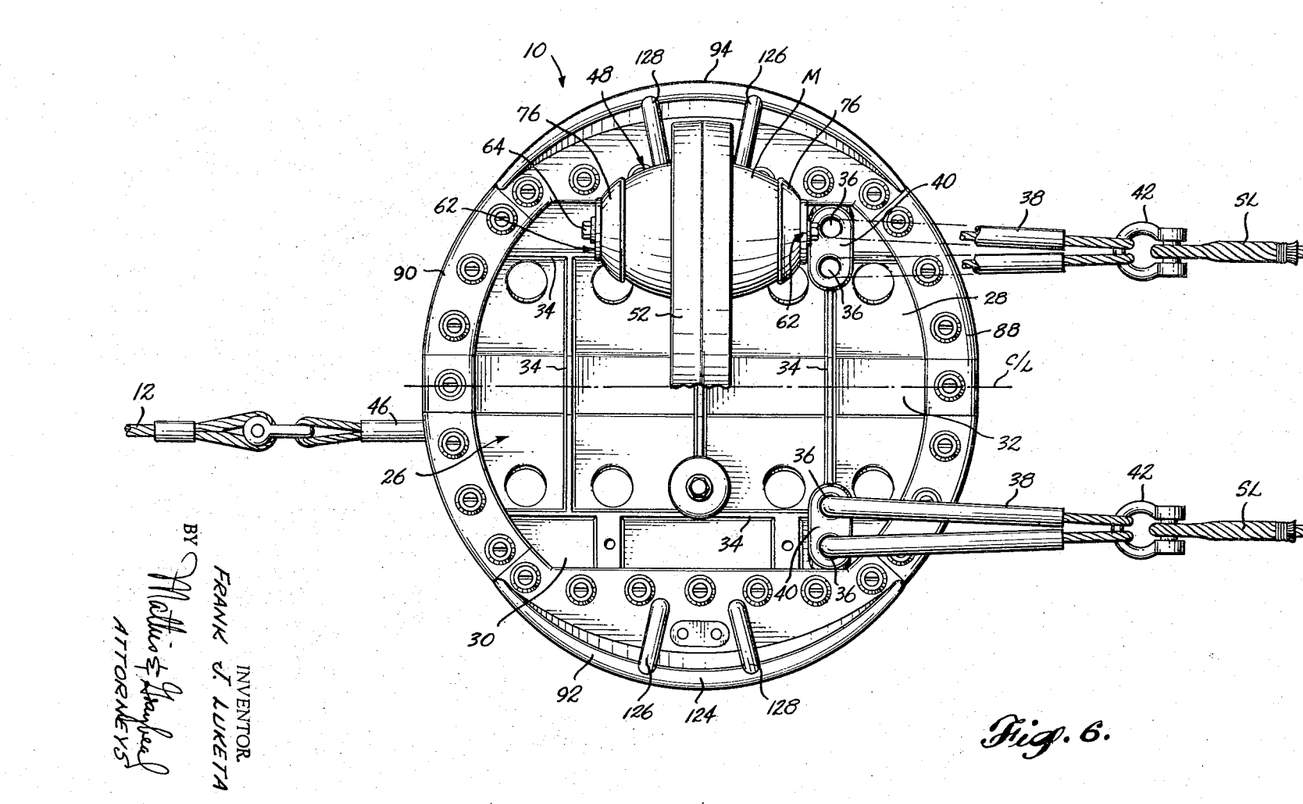
FIG. 6 is a view on the same scale as FIG. 5 of the posterior side of the port door shown in FIGS. 1 and 3, with parts cut away or omitted for clarity of illustration, such view together with FIG. 5 clearly showing the circular configuration of the door panel, the manner of attachment of the sweep lines to such panel, the symmetrical construction of the door enabling it to be used interchangeably on either side of the net, and the construction of the towing bridle for the door.

As shown in FIGS. 5 and 6, for example, the flexible shackles 38 each consists of a short length of wire rope or cable having an eye formed at each terminal, provided with a sheath or covering of rubber or like material in the extent thereof intermediate such terminals. The two leg portions are inserted from the anterior side of the door through the openings 36, and are then pulled on through such openings until the bright portion of the shackle engages the part of the boss 40 that is situated between the openings 36. The two terminal eyes are connected to the forward terminal eye of a related one of the sweep lines SL by means of a conventional shackle 42, or the like.

A bridle 44, hereinafter to be described in greater detail, is situated on the anterior side of panel 26, and the towing warp 12 is connected to it in a manner and by means which will also be hereinafter described in detail.

A plurality of attitude control attachments in the form of a buoyancy means 48, ballast means 50, and a roll bar 52 are attached to the posterior side of the water reaction panel. The particular form of buoyancy means 48 and ballast means 50 that are illustrated represent typical embodiments of the buoyancy and ballast means forming the subject matter of my copending application Ser. No. 376,993, filed June 22, 1964, and entitled Ballast and Buoyancy Attachments for Trawl Doors.

Figures 2, 3:
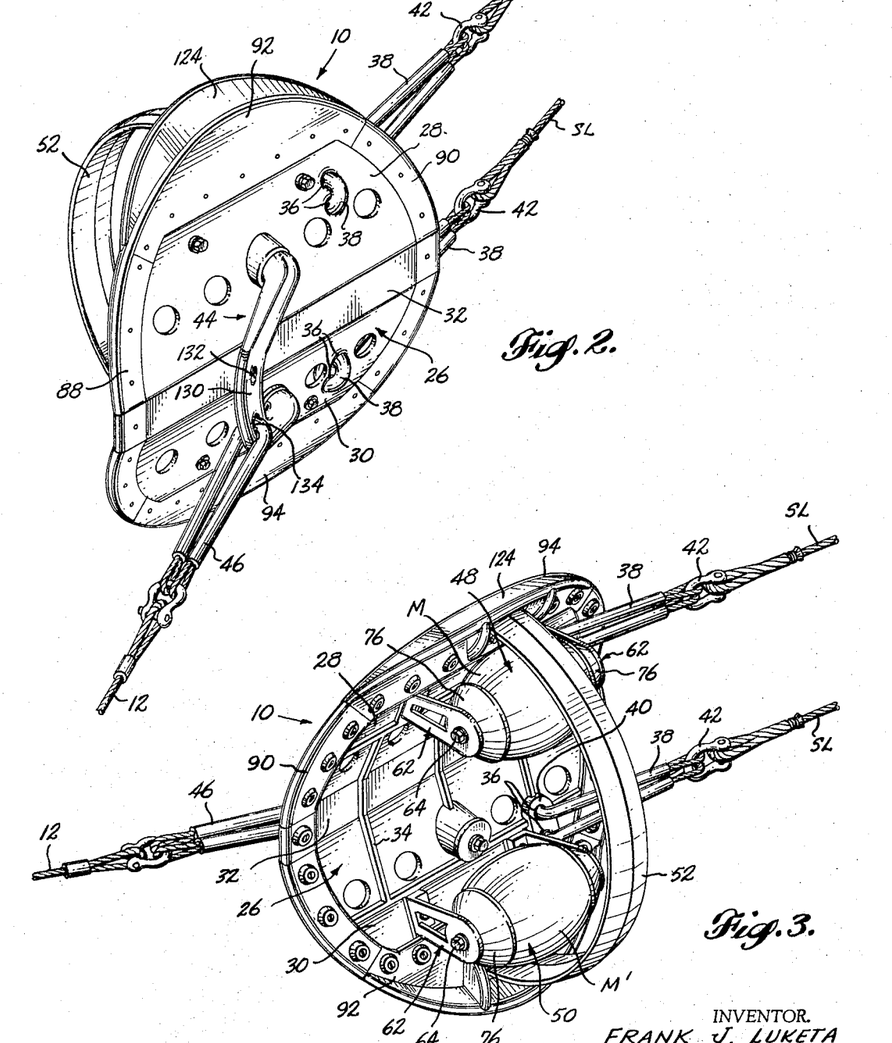
FIG. 2 is an enlarged scale perspective view of the anterior side of the starboard door of FIG. 1.
FIG. 3 is an enlarged scale perspective view of the posterior side of the port door of FIG. 1.
Figure 4:
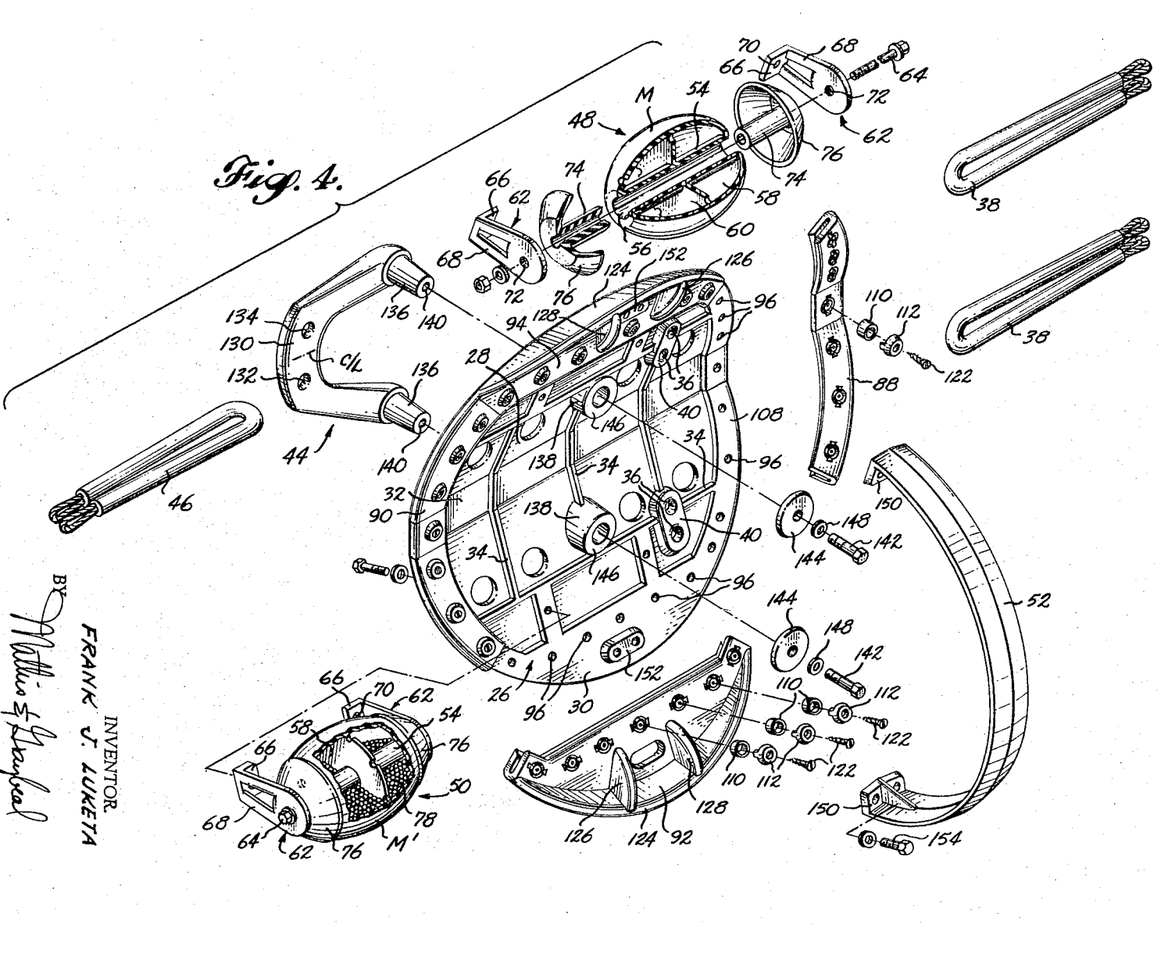
FIG. 4 is an exploded perspective view of a port trawl door constructed in accordance with the present invention.
Figures 7, 8, 9, 10, 11:
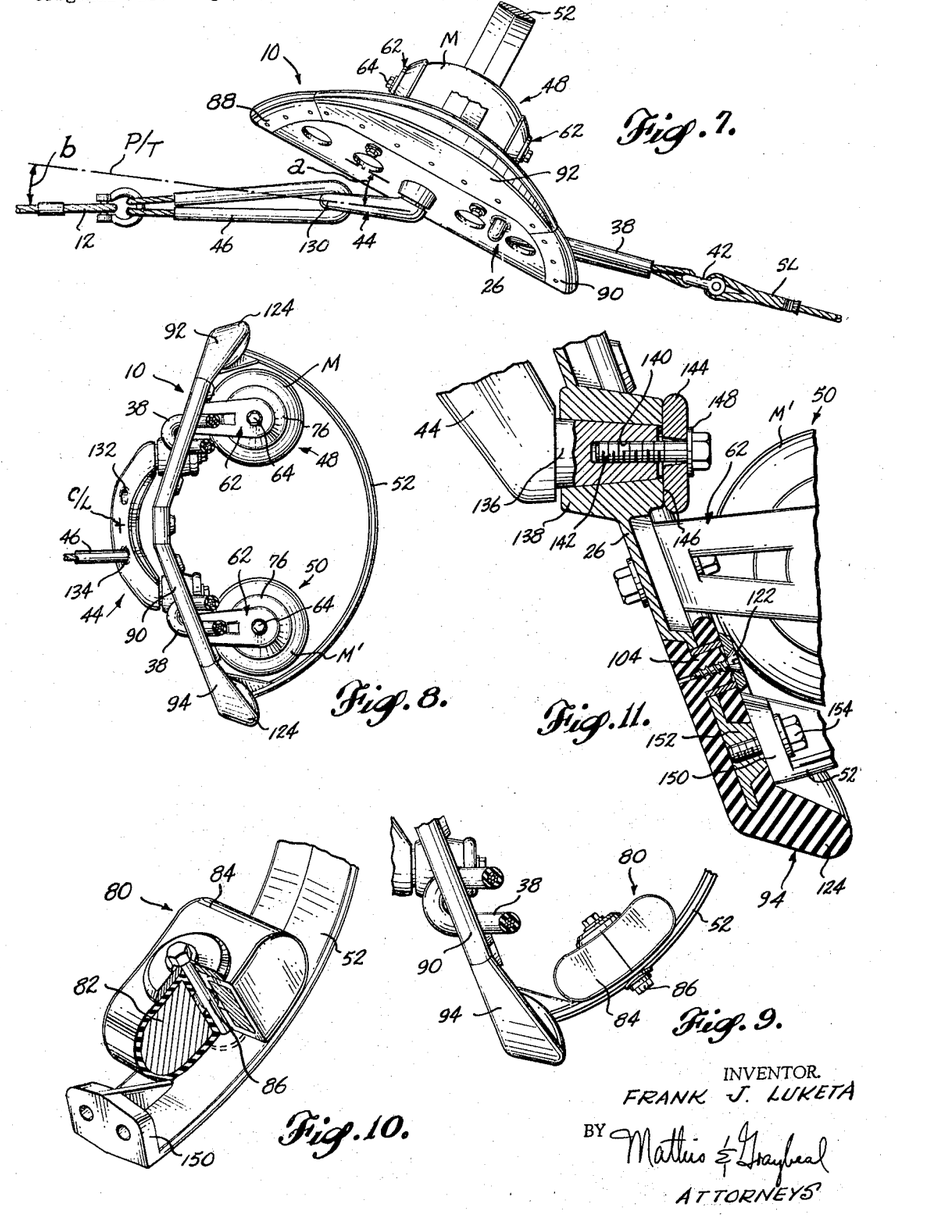
FIG. 7 is a top plan view of the starboard side door, with a portion of the roll bar cut away for clarity of illustration.
FIG. 8 is a rear elevational view of the starboard door, such view clearly showing the polyhedral transverse configuration of the door panel, and the relative arrangement of the buoyancy means, the ballasting means and the roll bar on the posterior side of said door.
FIG. 9 is a fragmentary end elevational view of the lower edge portion of the door, showing a modified form of ballasting, which is disposed inside of and attached to the lower portion of the roll bar, rather than on the door panel itself.
FIG. 10 is a fragmentary perspective view of the lower end portion of the roll bar, showing the modified form of ballasting means attached, and partly in section for clarity of illustration.
FIG. 11 is a fragmentary, enlarged scale, rear elevational view of the lower edge portion of the trawl door, with parts being shown in section for clarity of illustration, said view clearly showing the mounting means for the bridle, and the construction of the rubber edging and the preferred manner of attachment of the same onto the door panel.

As shown by FIGS. 3, 4 and 8, the buoyancy means 48 and the ballast means 50 are of similar construction. Each comprises a body member M or M', which are of identical construction. The representative form of body member M, M', shown in FIGS. 3, 4 and 8 comprises wall means 54 forming an elongated central passageway 56 and a toroidal chamber 58 surrounding said passageway 56. The body members M, M', which may be molded out of a suitable plastic or formed from aluminum, for example, may be formed to include a centrally located transverse support wall or partition 60 so as to make it more rigid.

Identical mounting structure is used for both body members M, M'. The mounting structure comprises a pair of end standards 62 and a securement rod or bolt 64. The preferred form of each end standard comprises a relatively short foot or base 66 and an elongated arm 68 extending substantially at a right angle with respect to the base 66. Each end standard 62 is preferably constructed so as to be removably secured to the water reaction panel 26 by a bolt fastener or the like extending through matched openings in the panel 26 and the base portion 66 of the end standard 62. The bolt receiving openings 70 in the bases 66 are clearly illustrated in FIG. 4.

The outboard end portions of the arms 68 are also formed to include a bolt receiving opening 72 (FIG. 4). The arms 68 of each pair of end standards 62 extend outwardly from the door panel 26 in parallel fashion. The body members M, M' are disposed between the end standard 62 and are removably secured thereto by the securement rod or bolt 64.

In the illustrated embodiment, the diameter of the elongated passageway 56 is larger than the diameter of the securement rod 64. A spacer sleeve 74 of rubber or like material having an outside diameter substantially equal to the diameter of the passageway 56 and a central bore of a diameter substantially equal to the diameter of the securement rod 64 fits into each end of the body members M, M'. The rod 64 then extends through the bores of the spacer sleeve 74.

The distance between the arms 68 of each pair of end standards 62 may be slightly larger than the end-to-end length of the body members M, M', in which case the spacer sleeves 36 are provided at their outboard end with a cap portion 76 shaped to match the end configuration of the body member M, M'.

The toroidal chamber 58 of the body member M, forming a part of the buoyancy means 48, contains air or gas and is constructed so as to be gas tight. This gives the buoyancy means 48 a gross specific gravity substantially less than one, making it buoyant. The toroidal chamber 58 of the body member M', forming a part of the ballast means 50, is filled with a relatively heavy ballast material, such as lead pellets 78, as illustrated. This gives the ballast means 50 a gross specific gravity substantially greater than one.

Owing to its relative small size, the representative form of door that is illustrated, which as previously mentioned is adapted for use with a try net, needs but a single buoyancy means 48 and a single ballast means 50 to provide the desired amount of attitude correction of the door.

When a given door 10 is inverted, and the buoyant body members M are substituted for the weighted body members M', the end standards 62 of the latter become the mounting means for the former. This is also true at the opposite edge location on the door, where the weighted body members M' replace the buoyant body members M. Alternatively, the entire buoyancy means 48, including its end standards, may be interchanged with the entire ballast means assembly 50.

The roll bar 52 forms the subject matter of my copending application Ser. No. 393,139, filed Aug. 31, 1964, and entitled Self-Uprighting Trawl Doors. It prevents the door D from falling over on its posterior side and lying substantially flat on the bottom in a position wherein at least under certain circumstances it is difficult to cause the door 10 to right itself and assume the proper disposition.

In FIGS. 9 and 10, a modified form of ballast weight, designated 80 and consisting of a solid piece of lead 82 or other heavy material sheathed in a casing 84 of rubber or like material, is shown secured by a bolt 86 to a lower portion of the roll bar 52.

A sectional, marginal edging of resiliently compressible cushioning, abrasion resistant, lightweight material such as cured rubber extends around the entire periphery of the panel 26. The broad concept of providing the water reaction panel of a trawl door with marginal edging in part forms the subject matter of my U.S. Patent No. 3,231,998. Specific trawl door arrangements involving marginal edging of sectional construction are disclosed in and in part form the subject matter of my U.S. Patent No. 3,225,483. To the extent necessary to a better understanding of the present invention, the respective disclosures of these two applications are hereby incorporated herein by reference.

According to the present invention, the marginal edging preferably consists of four sections, including identical and interchangeable front and rear sections, and identical and interchangeable top and bottom sections. The sections which are disposed at the front and rear edges, respectively of the port door (FIG. 5, for example) are designated 88, 90, and the sections disposed at the top and bottom edges of such door are designated 92, 94. With respect to the starboard door (FIG. 3, for example) the reference designations are reversed. The sections 88, 90 and 92, 94 are suitably molded into the shapes illustrated, and since but two different shapes are involved, only two molds are required.

Figure 12:
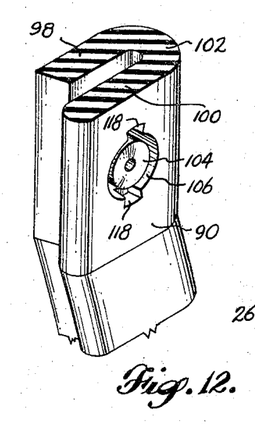
FIG. 12 is a perspective view of a portion of the edging for the front and rear edges of the door, taken in the vicinity of a fastener.
Figure 13:
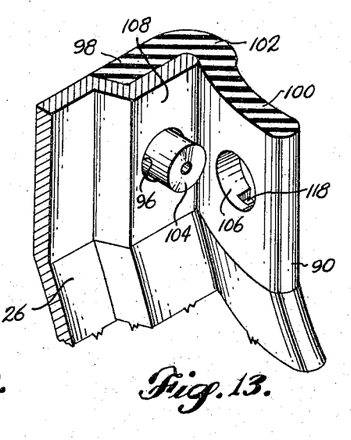
FIG. 13 is another perspective view of the portion of edging shown by FIG. 12, with the separable side portions or flaps spread apart and a portion of the door panel inserted into place for assembly.

A particular advantageous manner of interconnecting the sections 88, 90, 92, 94 of edging with the panel 26 is illustrated specifically in FIGS. 11–19 in connection with edging section 90. Of course, it is to be understood that the manner of interconnecting edging section 90 onto panel 26 applies equally as well to the other sections 88, 92, 94. It involves fabrication of the panel 26 with a series of openings or holes 96 spaced slightly inwardly from its peripheral edge. Edging section 90 (also 88, 92, 94) are formed to include relatively flat side portions 98, 100 and an interconnecting bight portion 102. A plurality of cylindrical plug projections 104 are formed on the inner surface of said portion 98. When edging section 90 is in natural state, as illustrated in FIG. 12, for example, the projections 104 extend into and are concentrically related to a like number of corresponding openings 106 formed in side portion 100. Preferably the marginal portion 108 of the panel 26 which carries the openings 96 is a rearwardly offset from the central portion of the panel 26 in a manner such that when the marginal edging is in place the anterior surface of side portion 98 is substantially flush with the forward or anterior surface of the central portion of the panel 26. This arrangement gives the anterior side of the door a relatively uninterrupted surface over which the water may flow, i.e. the marginal edging does not obstruct the smooth flow of water across the anterior face of the door 10.

Figure 14:
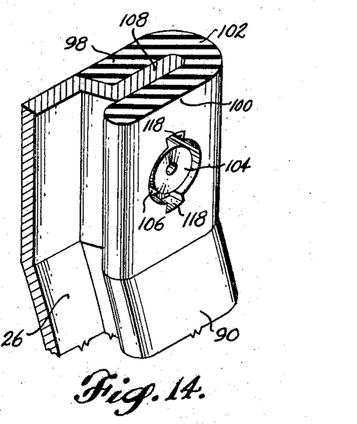
FIG. 14 is a view like FIG. 12, but with the door panel interposed between the two side flaps of the edging.
Figures 15, 16, 17:
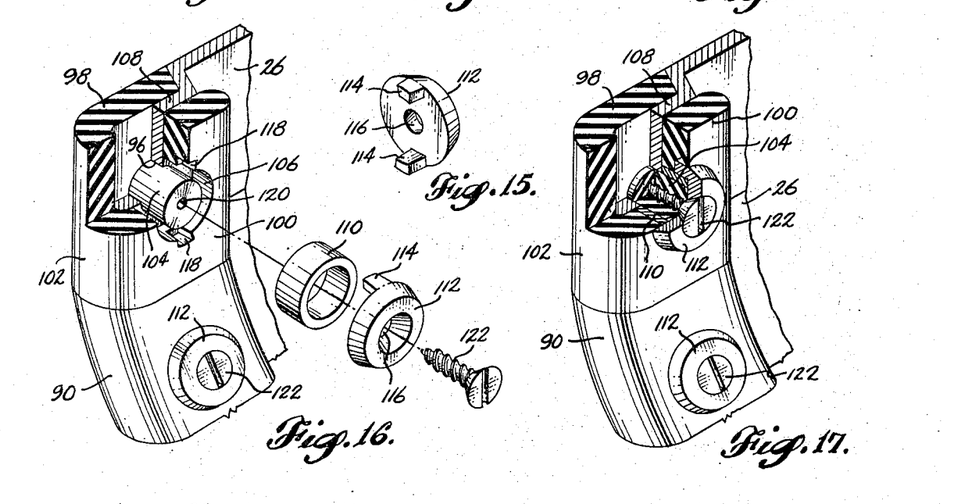
FIG. 15 is a perspective view of the lock washer employed as a portion of the coupling means for the edging.
FIG. 16 is a view similar to FIG. 14, but taken at the front edge of the door, said view showing the edging and door panel in section in the vicinity of the connector opening, and presenting an exploded view of the coupler components.
FIG. 17 is a view like FIG. 16, but showing the coupler components assembled.
Figure 18:
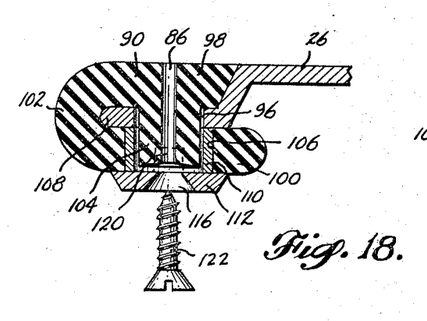
FIG. 18 is a transverse sectional view taken through the edging and door panel at a coupler location, substantially along line 18—18 of FIG. 5, such view showing the screw spaced out away from the coupler opening.
Figure 19:
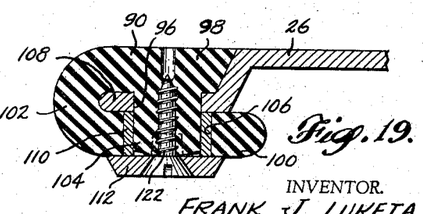
FIG. 19 is a view like FIG. 18, but showing the screw in its assembled position.

As shown by the succession of figures commencing with FIG. 12 and ending with FIG. 19, the edging sections are installed onto the door panel 26 by spreading apart the side portions 98, 100 and then inserting them around the offset marginal portion 108 of the panel 26 in a manner such that the several projections 104 extend through the corresponding openings 96. After this has been done the section 90 is allowed to reassume its natural shape (FIG. 14). A metal sleeve 110 is then inserted into the annular space formed between each projection 104 and the wall of the opening 106 which surrounds it. Next, a washer 112, having one or more raised portions or projections 114 formed on its inner surface, and a countersunk central opening 116 (FIG. 15), is installed over each sleeve 110 in a manner such that each projection 114 is received in a corresponding recess 118 formed in side portion 100, and its countersunk opening 116 is substantially concentrically related to a bore 120 formed in the corresponding projection 104. Lastly, a flat-headed screw 122 or the like is inserted through the opening 116 in washer 112 and is threaded into the bore 120. The threads of the screw 122 cut into and grip the rubber or like material forming the wall of bore 120. In addition, the threaded shank of screw 122 expands the projection 104 against the internal walls of the sleeve 110.

Since the water reaction panel 26, with marginal edging attached, possesses a circular outline, its resistance to movement through the water is less than the resistance of conventional doors having square or rectangular proportions. This is because water is able to flow relatively past the circular door of the present invention in the four regions designated A, B, C, D in FIG. 5, which regions would be occupied by the four corners of a door having rectangular proportions. Some of the water that flows through the regions A, B, C, D flows radially inwardly into the low pressure area or wake which is created behind the door and tends to lessen the size of this area. The fact that the radial distance into the center of the door is substantially equal from all points around the edge of the door also contributes to a smaller size wake than would exist if the door were oblong or of rectangular proportions.

Only the center portion of the lower edge contacts the ocean bottom, i.e. the contact made is substantially a point contact. The edging sections 92, 94 are each formed to include a runner portion 124 which serves to somewhat widen and lengthen the point of contact of whichever of these sections is located along the lower edge of a given door. The runner portion 124 lessens the tendency of the door to dig in, but it does not greatly increase the area of contact made by the lower edge with the bottom. As a net result, this arrangement, involving a lower edge that is a segment of a circle, results in less contact being made between the lower edge of the door and the bottom that is the case with known conventional doors of rectangular proportions having an elongated lower edge in contact with the bottom. As will be evident, this lessening of the area of contact of the lower edge of the door with the bottom also lessens the amount of sliding frictional resistance, and in turn the total resistance of the door to movement in the forward direction.

As clearly shown in FIG. 4, for example, each runner portion 124 progressively widens as it extends inwardly from the ends of edging sections 92, 94 towards the middle. The sections 92, 94 may also be formed to include right angle knee braces 126, 128 for adding strength and rigidity to the runners 124. According to the invention, the braces 126, 128 are integrally molded or formed with the runners 124 and the side and bight portions of the sections 92, 94, and hence are made of the same material (e.g. cured rubber).

The bridle 44 is constructed and arranged in a manner designed to minimize the drag which it produces and adds to the total drag of the door 10. Firstly, the bridle 44 is made relatively small in size and constitutes only two legs. Preferably, it is of one piece construction and is made to have a generally U-shape. The bight portion 130 is somewhat teardrop shaped or streamlined in the direction of travel, and the two leg portions are laterally rounded and otherwise smoothly shaped and streamlined throughout. As perhaps best shown by FIG. 7, the bridle 44 is arranged to make an angle $a$ with the leading face of the water reaction panel 26 that is substantially equal to the angle of attack of said panel 26. This results in the general plane of the bridle 44 extending substantially in parallelism with the path of travel P/T (FIG. 7) of the trawler, resulting in the water flowing relatively around and passed it somewhat evenly on both of its sides, and consequently with a minimum of drag. The angle $b$ depicted in FIG. 7 represents the angle of divergence of the towing warp 12 from the direction of travel P/T of the trawler.

In the manner characteristic of the bridle arrangement disclosed and claimed in my prior U.S. Patent No. 3,048,936, issued Aug. 14, 1962, and entitled V-Door For Trawling And Bridle Therefor, and in my aforementioned copending application Ser. No. 269,454, for example, the towing warp 12 is attached to the bridle 44 at a point downwardly offset from the center plane of the panel 26 (FIG. 5) in order that the door in use is tilted substantially outwardly and rearwardly so that the water thrust against the upwardly facing panel portion 28 is greater than the thrust against the downwardly facing panel portion 30. For this purpose, when the door is being used as a port door (FIGS. 3, 4 and 6, for example) the hookup of the towing warp 12 is to an anchor eye 132 laterally offset below (as shown in FIG. 4, for example) the horizontal center line (designated C/L) of the door, the specific hookup shown being by means of the flexible shackle 46. A reversely offset anchor eye 134 is also provided for use as the hookup point for the towing warp 12 when the door is inverted for use as a starboard door, the situation illustrated in FIGS. 2, 5, 7 and 8, for example.

When the door D is being handled out of the water, such as on the deck of the trawler, the bridle 44 may be conveniently used as a handle, with the bight portion 130 serving as the hand grip, for example.

The two inboard extremities 136 of the arm portions of the bridle 44 are preferably reduced in size in comparison with the arm portions as a whole, and are frustoconical in shape. As perhaps best shown in FIG. 11, each such extremity 136 is snugly received and accommodated in a socket formed in a boss 138 formed on the water reaction panel 26. The outwardly tapering extremities 136 are each formed to include an internally threaded blind bore 140. A stud or bolt 142, engaging a washer 144, is brought into alignment with the bore 140 from the posterior side of the door panel 26 and is then screwed into the blind bore 140. As the bolt 140 is tightened, the tapered end portion 136 of the bridle 44 is drawn into tight engagement with the side wall of the socket opening, the washer 144 is put into compression by being squeezed between the head of the bolt 142 and the annular surface 146 of the boss 138, surrounding the socket opening on the posterior side of the panel 26. A small washer 148 may be inserted between the head of bolt 142 and the larger washer 144.

It is to be recognized that the above-described mounting means for the bridle 44 may also be used to good advantage in mounting other trawl door accessories, such as the roll bar 52, for example, onto the door panel 26.

In the illustrated embodiment of door 10, an apertured flange 150 is formed at each end of the roll bar 52. The flanges 150 constitute mounting bases for the roll bar 52 by which it is mounted onto the water reaction panel. The flanges 150 abut against bosses 152 formed on the posterior side of the door panel 26, and suitable fastening means, such as bolts 154, removably secure the flanges 150 to the bosses 152.

From the foregoing, various further modifications, arrangements, and adaptations of trawl doors and trawl door accessories and components according to the present invention will occur to those skilled in the art to which the invention is addressed, within the scope of the following claims.

What is claimed is:

1. A trawl door comprising a susbtantially circular water reaction panel having a rearwardly offset marginal portion, a resiliently compressible, wear-resistant marginal edging extending entirely about the substantially circular edge of said panel, with a portion of said edging being disposed on the anterior side of said panel, in juxtaposition with said offset marginal portion of the panel, and having a generally flat anterior surface that substantially merges into and is generally flush with the anterior surface of that portion of the panel situated immediately inboardly adjacent the said marginal edging, and an edge surface which curves rearwardly about the edge of said panel from said anterior surface; towing warp securement means on the anterior side of said panel, and net line securement means on said door.

2. A trawl door according to claim 1, wherein said edging is sectional and said door further includes means for detachably mounting each of the sections of edging onto the door panel.

3. A trawl door according to claim 2, wherein said door includes identical, interchangeable front and rear sections of edging and identical, interchangeable top and bottom sections of edging.

4. A trawl door according to claim 3, wherein the top and bottom sections of edging each comprise relatively wide bottom contacting, runner portions in a fixed position relative to the water reaction panel.

5. A trawl door comprising a substantially circular water reaction panel provided with an offset perimetrical edge, generally polyhedral configuration in vertical section, and a one-piece cast structural aluminum construction, a substantially thick, resilient, wear assuming edging of a rubber-like material extending entirely about the offset perimetrical edge of said panel; towing warp securement means on the anterior side of said panel; and net line securement means on said door.

6. A trawl door according to claim 5, wherein said water reaction panel is formed to include vertically extending reinforcement rib means on its posterior side, cast integral with said panel.

7. A bottom trawl door comprising a relatively thin, metallic water reaction panel, and a resiliently compressible, wear assuming protective edging extending along at least the lower edge of said panel, with the marginal portion of said panel, at least in the vicinity of said lower edge, being offset rearwardly from the portion of said panel situated immediately adjacent such marginal portion, and with a portion of said edging extending in juxtaposition with said marginal portion of the panel, on the anterior side of the panel, and having an anterior surface that is substantially flush with the anterior surface of the said portion of the water reaction panel that is situated immediately inboardly of said offset portion of the panel, and means for detachably securing said edging to the panel.

8. A trawl door according to claim 7, wherein the said water reaction panel is susbtantially circular in shape, and the edging includes a relatively wide bottom contacting runner portion extending out rearwardly from the panel, generally whereat the door makes a substantially point contact with the bottom when in use, said runner portion including a bottom surface which meets and extends rearwardly from the anterior surface of said edging.

9. A trawl door comprising a water reaction panel having openings formed in a marginal edge portion thereof, and an edging of resiliently compressible, rubber-like material extending along at least a portion of said panel's marginal edge, said edging including means of rubber-like material insertable through said openings formed in the marginal edge portion of said panel from one side thereof, and screw fastener means threadable into said means of rubber-like material, from the opposite side of said marginal portion, for securing the edging to the panel.

10. A trawl door comprising a water reaction panel and a wear-resistant edging extending at least along the lower edge of said panel, said panel being formed to include a series of openings arranged contiguous to the said lower edge, and said edging including a side portion contiguously outboardly of each side of the door panel adjacent the said lower edge thereof, and a portion interconnecting the said side portions outboardly of the said lower edge, with one of the side portions of edging being formed to include a plurality of plug elements projecting from the inboard side thereof through the said openings formed in the marginal portion of the door panel, and with said door further including fastening means extending through the opposite side member of the marginal edging and into the said plug members for securing the edging onto the door panel.

11. A trawl door according to claim 10, wherein the outboard surface of the side portion of edging on the anterior side of the water reaction panel is flush with the adjacent surface portion of said water reaction panel.

12. A trawl door comprising a water reaction panel having a marginal edge, at least a portion of which includes a series of openings therein, and a wear-resistant edging extending along at least said portion of the marginal edge, said edging including a pair of opposite side parts, situated contiguously outboardly of said edge portion having the openings therein, on opposite sides thereof, and a part which extends around the panel's edge, and interconnects the said side parts, with one of the side parts of edging including a plurality of projections which extend through the said openings formed in the panel, and with said door further including connector means extending through the opposite side part of the marginal edging, and the said openings, and then connecting to said projections, for securing the edging onto the panel.

References Cited

UNITED STATES PATENTS

| | | | |
|---|---|---|---|
| 1,548,409 | 8/1925 | De Boer et al. | 43—9 |
| 1,880,059 | 9/1932 | Vigneron | 43—9 |
| 2,066,519 | 1/1937 | Clark | 43—9 |
| 2,548,915 | 4/1951 | Sorensen | 43—9 |
| 2,689,425 | 9/1954 | De Veen | 43—9 |
| 2,758,408 | 8/1956 | Murphy et al. | 43—42.09 |
| 2,942,371 | 6/1960 | Johnson et al. | 43—9 |

FOREIGN PATENTS

| | | |
|---|---|---|
| 210,439 | 5/1924 | Great Britain. |
| 546,842 | 7/1942 | Great Britain. |

SAMUEL KOREN, *Primary Examiner.*

WARNER H. CAMP, *Examiner.*